United States Patent [19]

Kurolawa et al.

[11] 3,770,881

[45] Nov. 6, 1973

[54] COLOR TELEVISION CAMERA

[75] Inventors: Hiromichi Kurolawa; Yasuharu Kubota, Kanagawa, Japan

[73] Assignee: Sony-Corporation, Tokyo, Japan

[22] Filed: Sept. 18, 1972

[21] Appl. No.: 289,586

[30] Foreign Application Priority Data

Oct. 28, 1971 Japan .............................. 46/85880

[52] U.S. Cl. .............................. 178/5.4 ST

[51] Int. Cl. .............................. H04n 9/06

[58] Field of Search .............................. 178/5.4 ST, 5.4 F, 178/7.2; 315/31; 313/83, 84, 85, 65 R, 66

[56] References Cited

UNITED STATES PATENTS

| | | | |
|---|---|---|---|
| 2,212,640 | 8/1940 | Hogan | 313/84 |
| 2,613,333 | 10/1952 | Bull | 313/83 |

*Primary Examiner*—Robert L. Griffin
*Assistant Examiner*—John C. Martin
*Attorney*—Lewis H. Eslinger et al.

[57] ABSTRACT

A color television camera with a photoconductive pickup tube having strip electrodes perpendicular to the scanning lines to impress an index signal on the luminance and chrominance signals generated by the tube. The tube includes means to generate a beam that strikes the target with a spot that is elongated in the direction perpendicular to the scanning lines. The beam may be formed to have an elliptical cross-section or it may be formed with a round cross-section and then distorted to have an elliptical cross-section or deflected very rapidly and for only a short distance to create the effect of an elliptical cross-section. The length of the ellipse is preferably greater than twice the distance between successively scanned lines.

8 Claims, 29 Drawing Figures

COLOR TELEVISION CAMERA

BACKGROUND OF THE INVENTION

1. Field of the Invention

This invention relates to the field of color television pickup tubes with index electrodes in the form of parallel strips perpendicular to the scanning lines. In particular the invention relates to means for improving the signal-to-noise ratio of the index signal without producing objectional line crawl in the resultant signal, particularly when the tube is used at low light levels.

2. The Prior Art

A color pickup tube and its associated circuits have been described heretofore in U.S. Pat. No. 3,688,020. That tube included a plurality of sets of strip electrodes, alternately arranged on a photoelectric conversion layer and spaced apart side by side so as to have a predetermined pitch. Offset voltages are applied to the sets of electrodes in such a manner that the offset voltages applied to the sets reverse their polarity at every horizontal line interval. The image of the object to be televised is divided into its color components by a color separation filter made up of narrow strips of individual color transmissive filter material. The color filter strips are parallel to the strip electrodes and are arranged in a specific position relative to the strip electrodes. A photoelectric conversion layer covering the area of all of the electrodes produces a television signal when scanned by the electron beam of the tube, and this signal includes both index components and color signal components.

A color pickup tube of the foregoing type is capable of generating a color signal with no crosstalk and with high resolution. However, when there is little incident light on the photoelectric conversion layer, the amplitude of the index signal may be reduced to a value that is not acceptable. Alternatively, the amplitude of the index signal may be increased but the signal-to-noise ratio of such a signal is likely to be low. When the signal-to-noise ratio of the index signal is low, it is difficult to separate the respective color signals in the circuits associated with the pickup tube. The problem of inadequate index signal in response to low light levels is especially bad when the photoelectric conversion layer has a relatively low dark current and is made of a material such as lead oxide, arsenic triselenide, cadmium selenide, antimony trisulfide, etc.

In order to avoid this problem, an offset drive voltage having a high enough level to provide good index operation may be used, but this is likely to produce an effect known as "line-crawling" in the reproduced television picture.

It is an object of the present invention to provide a color television pickup apparatus that will prevent the appearance of lien-crawling and yet will produce an index signal of high enough level to have a good signal-to-noise ratio.

BRIEF DESCRIPTION OF THE INVENTION

In the color pickup apparatus according to the present invention, there is provided an electron beam shaping means to form the electron beam in such a manner that the effective shape of the spot on the photoelectric conversion layer is elongated in the direction substantially perpendicular to the scanning lines, and the length of the spot is longer than the distance between successively scanned lines.

BRIEF DESCRIPTION OF THE DRAWINGS

As shown in FIGS. 1, 2 and 3, a pickup tube 2 includes a photoelectric conversion layer 1 (for example, a photoconductive layer made of antimony trisulfide), which is scanned by an electron beam. The layer 1 is part of a target that includes a plurality of sets of elongated transparent electrodes (for example, NESA electrodes) with a predetermined width (for example, 30 microns). The electrodes are indicated by reference characters $A_1$, $B_1$, ..., $A_i$, $B_i$, ... $A_n$, $B_n$ and are alternately arranged with a predetermined distance or space (for example, 5 microns) between the adjacent ones. In the drawings, reference letter A generally designates all of the electrodes $A_1$, $A_2$, ..., $A_n$ and letter B represents all of the other electrodes $B_1$, $B_2$, ..., $B_n$, respectively. In this case, the arrangement of the electrodes A and B are so selected that the longitudinal direction of the elongated electrodes A and B intersects the scanning direction, shown by an arrow d, of the electron beam. The electrodes A are connected to a signal output terminal $T_A$ and the electrodes B are connected to an output terminal $T_B$. In practice, the electrodes A and B are formed on a transparent protective plate (an insulating plate), for example, a glass plate 3, and the photoelectric conversion layer 1 is coated on the electrodes A and B. To th opposite surface of the glass plate 3, there is attached an optical filter F which consists of a plurality of sets of red, green and blue color optical strip filters $F_R$, $F_G$ and $F_B$, each set being of a predetermined width. In this case, each set of the strip filters $F_R$, $F_G$ and $F_B$ is arranged opposite two of the electrodes, for example, the electrodes $A_i$ and $B_i$ of the electrodes A and B, and the longitudinal direction of the filters are in alignment with longitudinal direction of the electrodes. In other words, the color optical strip filters are arranged in the order of $F_R$, $F_G$, $F_B$, $F_R$, $F_G$, $F_B$, $F_R$,°°°°. A glass face plate 4 is attached to the free surface of the optical filter F.

The photoelectric conversion layer 1, the electrodes A and B, the glass plate 3, the optical filter F and the face plate glass 4 are attached to one end of an envelope 5 as a disc the diameter of which is, for example, 1 inch.

Figure 1:
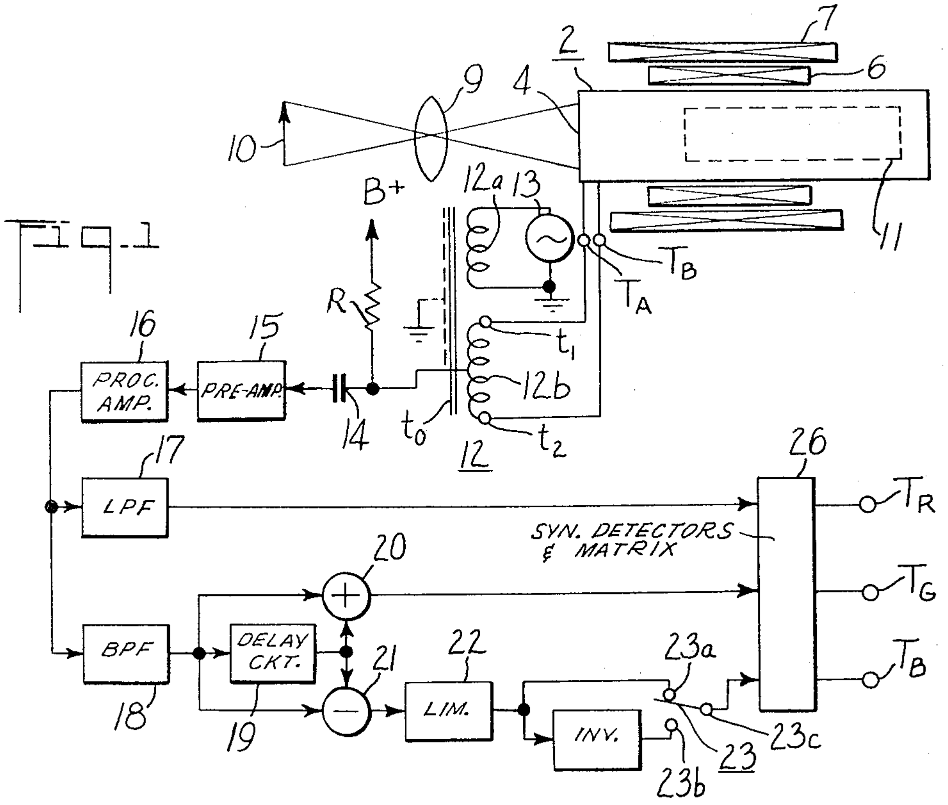
FIG. 1 is a schematic diagram illustrating an example of color pickup apparatus according to the invention.
Figure 2:
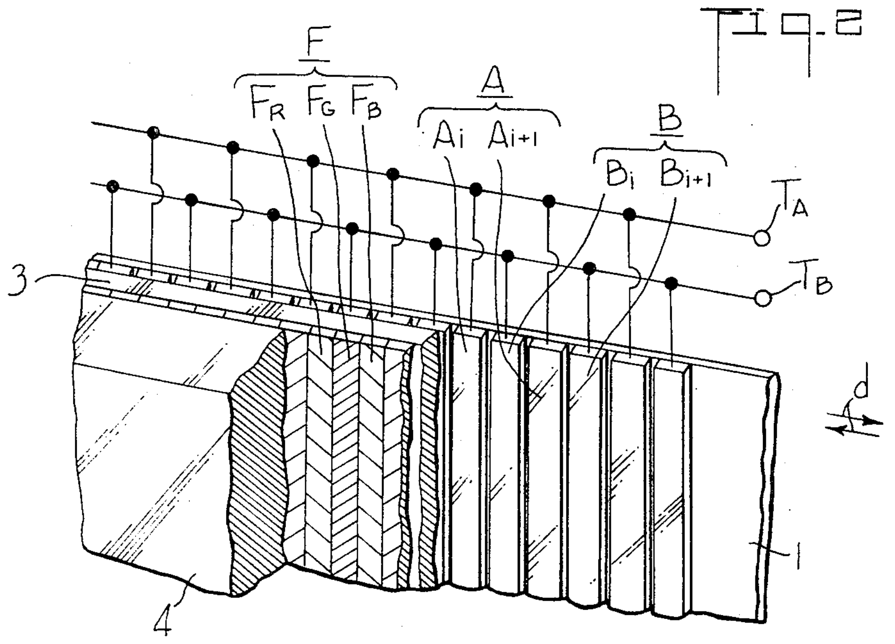
FIG. 2 is a perspective view, partially in cross-section, of a part of the pickup tube of the apparatus shown in FIG. 1.
Figure 3:
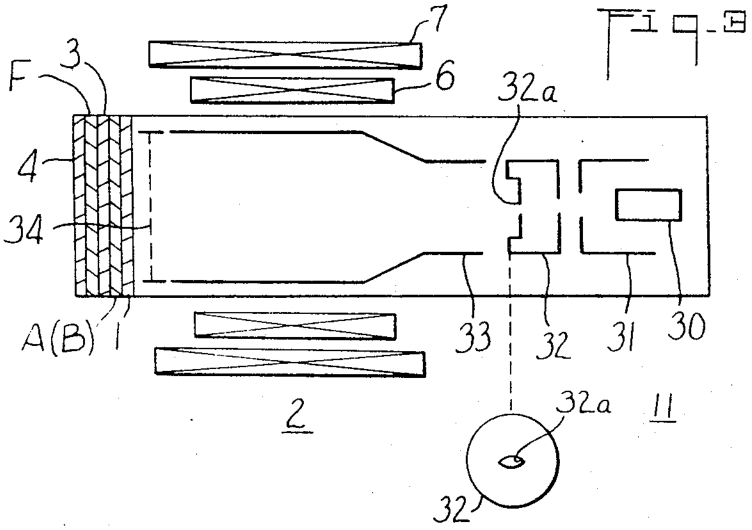
FIG. 3 is a cross-sectional view showing the main part of the pickup tube of the apparatus depicted in FIG. 1.
Figure 4:
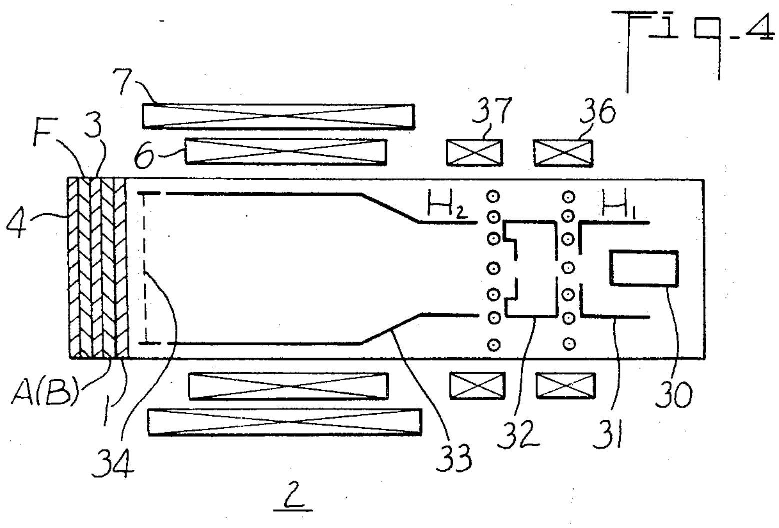
FIG. 4 is a cross-sectional view showing another example of a pickup tube used in the pickup apparatus of the invention.

In FIGS. 1, 3, and 4, reference numeral 11 generally represents an electron gun which includes a cathode 30, a first grid 31, a second grid 32, a third grid 33 and a mesh electrode 34, as in an ordinary vidicon. Reference numerals 6 and 7 indicate deflection coils, including horizontal and vertical deflection coils, and a converging coil disposed around the envelope 5.

In the embodiment of the invention exemplified in FIG. 3, in order that the spot of the electron beam on the photoelectric conversion layer 1 be somewhat elongated in a direction perpendicular to the electron beam scanning direction, there is formed in the second grid 32 as an electron beam shaping means an aperature 32a of elliptical cross-section, the longer diameter of which coincides with the scanning lines. Further, the aperture 32a is of such size, and the length of the spot of the beam on the photoelectric conversion layer 1 in the direction perpendicular to the beam scanning direction is, therefore, of such length that it is greater than the distance between successive scanning lines.

In this case, since the pickup tube 2 has an electromagnetically controlled beam, the beam is rotated by 90° by the focusing magnetic field. Accordingly, the beam spot focused on the photoelectric conversion layer 1 is in the form of an ellipse, the longer diameter of which is perpendicular to the scanning lines.

Figure 5:
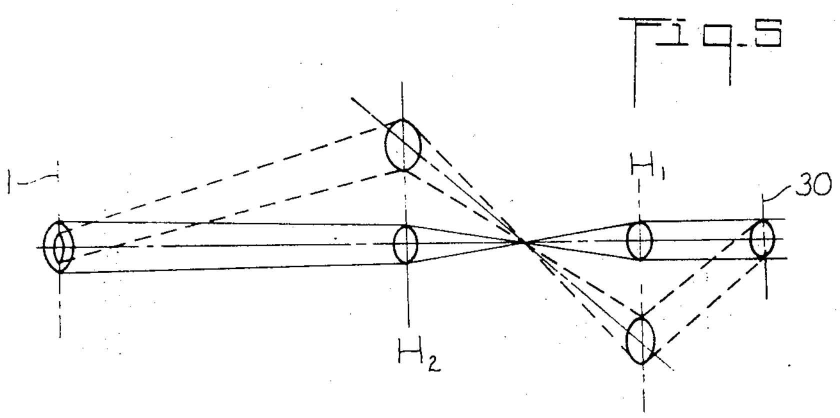
FIG. 5 is a schematic diagram illustrating the travelling of the electron beam in the pickup tube depicted in FIG. 5.

One example of the electron beam shaping means mentioned above is shown in FIGS. 4 and 5. FIG. 4 is a view of the pickup tube 2 located horizontally and FIG. 5 is a schematic diagram showing the travelling of the electron beam in the pickup tube 2 located vertically. In the example shown in FIGS. 4 and 5, instead of providing the aperture 32*a* of special shape in the second grid 32 as shown in FIG. 3, coils 36 and 37 are provided around the envelope 5 to shape the beam cross-section by forming magnetic fields $H_1$ and $H_1$ are so selected that when no current is supplied to the deflection coil 6 (horizontal and vertical coils), the electron beam arrives at the center point of the photoelectric conversion layer 1.

Accordingly, if the direction of the magnetic field $H_1$, is out of the sheet of the drawing while the direction of the magnetic field $H_2$ is into the sheet of the drawing, the electron beam emitted from the cathode 30 is deflected in the horizontal direction to the left side by the magnetic field $H_1$ with respect to its advancing direction and then deflected to the right side by the magnetic field $H_2$ to reach the photoelectric conversion layer 1 as shown by the dotted lines in FIG. 5. In this case, if the aperture 32*a* in the second grid 32 is shaped to be circular, as is usually the case, the cross-sectional shape of the electron beam across the magnetic field $H_2$ becomes elliptical and the longer diameter of the ellipse substantially coincides with the scanning direction of the electron beam. Since the electron beam is rotated 90° by the magnetic focusing field, the longer diameter of the spot of the beam as it strikes the photoelectric conversion layer 1 is substantially perpendicular to the line scanning direction of the beam.

It may be also possible that the spot of the beam on the photoelectric conversion layer 1 may be made elliptical by establishing a magnetic field in the horizontal direction between the photoelectric conversion layer 1 of the pickup tube 2 and the mesh electrode 34 and deflecting the beam after it passes through the mesh electrode 34.

Further, the electron beam cross-section may be elongated by causing the electron beam to wobble in one direction at a frequency of, for example, 10 MHz and to form its spot on the photoelectric conversion layer 1 as an oval, the longer diameter of which is substantially perpendicular to the line scanning direction of the beam.

Referring back to FIG. 1, a signal treatment for the output signal from the pickup tube 2 will be now described.

Figure 6:
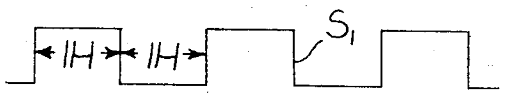
FIGS. 6 and 7A to 7F, inclusive, and FIGS. 7A', 7B', and 7C' are respectively waveform diagrams used for explaining the color pickup apparatus of the invention.

An offset drive signal $S_1$ applied to the electrodes A and B will be described now. A transformer 12 is provided and the ends of the secondary coil 12*b* are connected to the signal output terminals $T_A$ and $T_B$. A signal source 13 is connected to a primary coil 12*a* to produce the offset drive signal $S_1$ in synchronism with the line scanning period, or the horizontal scanning period, of the electron beam on the photoelectric conversion layer 1. As shown in FIG. 6, the offset drive voltage $S_1$ is a square wave and has its pulse with 1H equal to the horizontal scanning period H of the electron beam, for example, 63.5 micro-seconds. Therefore, the frequency of the wave $S_1$ is equal to one-half of the horizontal scanning frequency of the electron beam, or 15.75/2 KHz. Such an offset drive voltage $S_1$ may be obtained from the pulse signal which is delivered from a DC-DC converter of a high voltage generator (not shown). The center tap $t_0$ of the secondary coil 12*b* is connected through a capacitor 14 to the input side of a pre-amplifier 15 and to a DC power source $B^+$(of, for example, 10 to 50 volts) through a resistor R.

However, it may be possible that, instead of using such a transformer 12 shown in FIG. 1, a center-tapped resistor may be connected between the terminals $T_A$ and $T_B$ the center point of resistor connected as an output terminal. The rectangular wave signal mentioned above would then be supplied to the electrodes A and B through the center-tapped resistor and a capacitor.

Figures 7A, 7B, 7C, 7D, 7E, 7F:
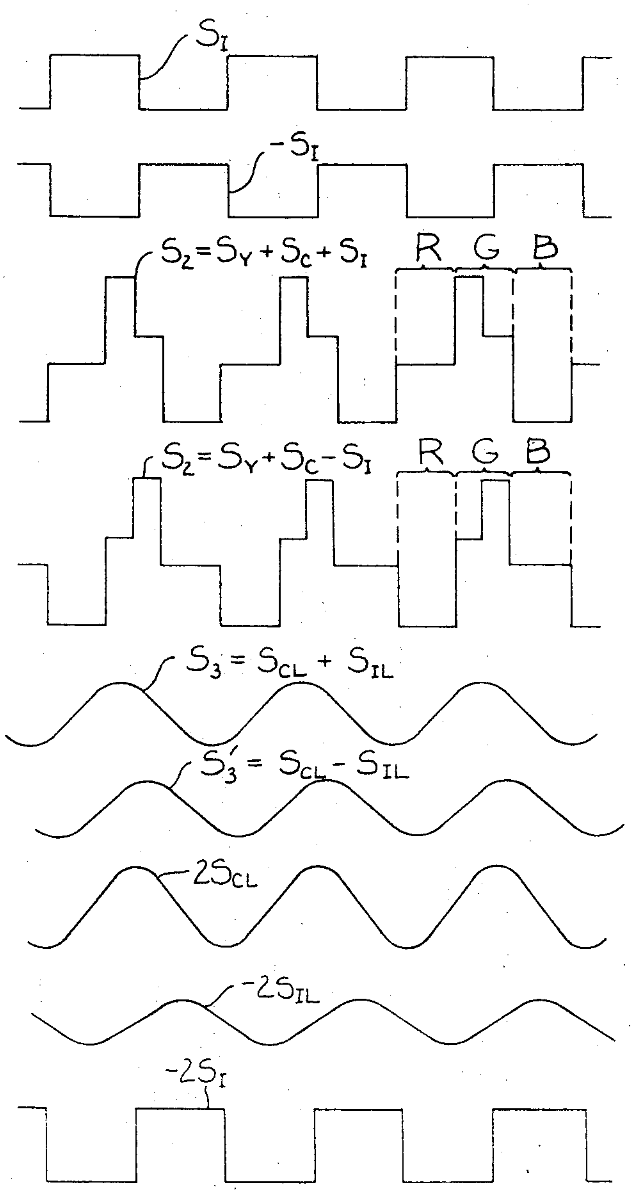
Figure 8:
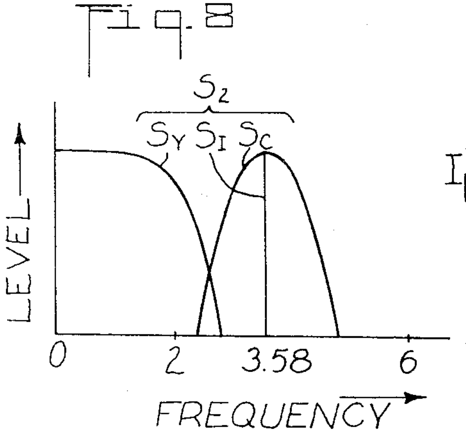
FIG. 8 is a waveform diagram showing an example of the frequency spectrum of a composite signal obtained from the color pickup apparatus.

The light from an object 10 is projected onto the photoelectric conversion layer 1 of the pickup tube 2 through a lens system 9. In this case, if the pickup tube 2 is not supplied with the light from the object 10, a rectangular waveform signal $S_i$ shown in FIG. 7A is obtained at the output side of the pre-amplifier 15 in a horizontal scanning period $H_i$ by the scanning of the electron beam on the photoelectric conversion layer 1. This signal $S_i$ serves as an index pulse signal. The frequency of the index signal $S_i$ is determined in accordance with the width of the electrodes A and B and the time required for one horizontal scanning period of the electron beam. In the illustrated example, the frequency of the index signal $S_I$ is set to be, for example, 3.58 MHz, which the N.T.S.C. color sub-carrier frequency. When the light from the object 10 impinges on the photoelectric conversion layer 1, the index signal $S_I$ is amplitude-modulated in accordance with the intensity of the light that passes through the red, green and blue filters to the photoelectric conversion layer 1. A composite color amplitude modulated and time-divided signal $S_2$ is obtained as shown in FIG. 7B. In FIG. 7B, the parts of the composite signal $S_2$ corresponding to the red, green and blue components are marked with reference letters R, G and B, respectively. The composite signal $S_2$ may be represented by a sum of a luminance signal $S_Y$, a chrominance signal $S_C$ and the index signal $S_I$, that is, as $S_2 = S_Y + S_C + S_I$. The frequency spectrum of the composite signal $S_2$ is determined as shown in FIG. 8, taking into account the widths of and distances between the electrodes A and B and the strip filter elements $F_R$, $F_G$ and $F_B$ of the optical filter F, as well as the horizontal scanning period. In other words, the composite signal $S_2$ is brought within a band of 6 MHz as a whole and the luminance signal $S_Y$ is located in its lower region while the chrominance signal $S_C$ is located in its upper region. In this case, it is preferred that there be little overlap between the luminance signal $S_Y$ and the chrominance signal $S_C$. For this reason, a lenticular lens may be placed in front of the pickup tube 2 to reduce the resolution thereof a little so as to make the band of the luminance signal $S_Y$ narrow, if necessary.

During the following horizontal scanning period $H_{i+1}$, the voltage applied to the electrodes A and B is reversed in polarity. Accordingly, as shown in FIG. 7A', an index signal $-S_I$ is obtained, which is reversed in polarity with respect to the index signal $S_I$ shown in FIG. 7A. As a result, a composite signal $S_2'$ is applied to the input side of the pre-amplifier 15 at this time, as shown in FIG. 7B'. This signal is expressed as $s_2' = S_Y + S_C - S_I$.

The composite signals $S_2$ and $S_2'$ are applied in sequence to the pre-amplifier 15 to be amplified and thereafter fed to a process-amplifier 16 which achieves wave shaping, $\gamma$-correction and the like of the composite signal passing through it. The output of the process-amplifier 16 is then applied to both a low pass filter 17 and a band pass filter (or a high pass filter) 18. The luminance signal $S_Y$ is derived from the low pass filter 17 and a signal, $S_3 = S_{CL} + S_{IL}$, shown in FIG. 7C (or a signal, $S_3' = S_{CL} - S_{IL}$ shown in FIG. 7C') is derived from the band pass filter 18. In this case, the signals $S_{CL}$ and $S_{IL}$ are low frequency components of the chrominance signal $S_C$ and the index signal $S_I$, respectively.

A description will now be given of separation of the index signal $S_I$ and the chrominance signal $S_C$. In this case, since the repeating frequency of the index signal $S_I$ and that of the chrominance signal $S_C$ are equal, so no filters need be used.

In FIG. 1, a delay circuit 19 is shown. This delay circuit delays the signal $S_3 = S_{CL} + S_{IL}$ (or $S_3' = S_{CL} - S_{IL}$) from the band pass filter 18 by one horizontal scanning period 1H. One practical example of the delay circuit 19 is a comb type filter made of quartz. An adding circuit 20 is supplied with the signal $S_3' = S_{CL} - S_{IL}$ from the band pass filter 18 during the horizontal scanning period $H_i$ and the signal $S_3 = S_{CL} + S_{IL}$ from the delay circuit 19 having the following horizontal scanning period $H_{i+1}$ and adds both the signals to produce a chrominance signal $2S_{CL}$ as shown in FIG. 7D. In this case, the chrominance signals $S_C$ in the adjacent horizontal scanning periods can be taken substantially the same. The signals $S_3 = S_{CL} + S_{IL}$ and $S_3' = S_{CL} - S_{IL}$ during the horizontal scanning periods $H_i$ and $H_{i+4}$ are also applied to a subtracting circuit 21 which carries out subtraction of $(S_{CL} - S_{IL})-(S_{CL} + S_{IL})$ or $(S_{CL} + S_{IL})-(S_{CL} + S_{IL})$ and produces an index signal $-2S_{IL}$ shown in FIG. 7E or $2S_{IL}$ (not shown). The index signal $-2S_{IL}$ or $2S_{IL}$ obtained in this way is applied to a limiter-amplifier 22 which shapes the index signal constant in amplitude and produces an index signal $-2S_I$ shown in FIG. 7F or $2S_I$ (not shown).

In FIG. 1 reference numeral 23 shows a change-over switch, which, in practice, is an electronic switch, has fixed contacts **23*a*, 23*b* and a movable contact 23*c*. The contact 23a is directly connected to the output side of the limiter amplifier 22 while the other contact 23*b* is connected through an inverter 24 to the output side of the limiter amplifier 22. In the change-over switch 23, the movable contact 23*c* contacts with the fixed contact 23*a* and 23*b* alternatively, in synchronism with the alternating signal $S_1$ applied to the primary coil 12*a* of the transformer 12, at every horizontal scanning period so as to always deliver the index signal $2S_1$ from the movable contact piece 23*c***.

A circuit 26 for color signals, which is a matrix circuit for demodulated chrominance signals in the example, is supplied with the luminance signal $S_Y$ from the low pass filter 17, the chrominance signal $S_{CL}$ from the adding circuit 20 and the index signal $S_I$ through the switch 23, respectively. The circuit 26 derives at its output terminal $T_R$, $T_G$ and $T_B$ red, green and blue color signals $S_R$, $S_G$ and $S_B$, respectively. The circuit 26 is supplied with, for example, the chrominance signal $S_{CL}$ and the signal which is provided by shifting the index signal $S_I$ a predetermined value to achieve demodulation and consists of a synchronizing detection circuit for producing color difference signals $S_R - S_Y$, $S_B - S_Y$ and $S_G - S_Y$ and a matrix circuit which is supplied with these color difference signals and the luminance signal $S_Y$ to produce the color signals $S_R$, $S_G$ and $S_B$.

Color television signals such as the NTSC system color television signal and so on can be obtained by suitably treating these red, green and blue signals. In this case, it may be possible, instead of producing the color signals with the circuit 26, to produce the NTSC signal directly. That is, the carrier wave for the composite signals $S_3$ and $S_3'$ may be replaced with the color sub-carrier wave (the frequency of which is 3.58MHz) in the NTSC system, and the color sub-carrier wave which is angle-modulated with the chrominance signal may be produced.

The relationship between the longer dimension of the spot of the electron beam on the photoelectric conversion layer, i.e., the dimension in the direction substantially perpendicualr to the electron beam line scanning direction, and the index signal current will now be described.

The longer dimension of the spot of the electron beam on the photoelectric conversion layer 1 in the direction substantially perpendicular to the electron beam scanning direction is taken as $L_B$ and the distance between successively scanned lines of the electron beam as $L_H$. When the longer diameter $L_B$ of the oval spot of the electron beam is changed, th peak to peak current value $I_{P-P}$ of the index signal current is given by the following equations (1) to (4) respectively, where the initial velocity of the electron beam is neglected. In the following equations (1) to (4), the term ΔC is the capacity of a picture element on the strip electrodes A and B, the term $\Delta T_C$ is the time during which the electron beam scans the picture element, the term $V_i$ is the value of the offset drive voltage $S_1$, and the term $V_s$ is the surface potential of the electron beam scanning surface on the photoelectric conversion layer 1. Further, it is assumed that the condition $V_S > V_i$ is satisfied in the equations.

$$I_{P-P} = (2\ \Delta C \cdot V_i)/(\Delta T_C) \cdot (2L_B)/(L_H) \text{ for } L_B \leq L_H/2 \quad (1)$$

$$P_{P-P} = 2\Delta C \cdot V_i/\Delta T_C \text{ for } L_H/2 \leq L_B \leq L_H \quad (2)$$

$$I_{P-P} = (4\Delta C \cdot V_i)/(\Delta T_C) \cdot L_B/(2L_H) \text{ for } L_H \leq L_B \leq 2L_H \quad (3)$$

$$I_{P-P} = (4\Delta C \cdot V_i)/(\Delta T_C) \text{ for } L_B \geq 2L_H \quad (4)$$

Figure 9:
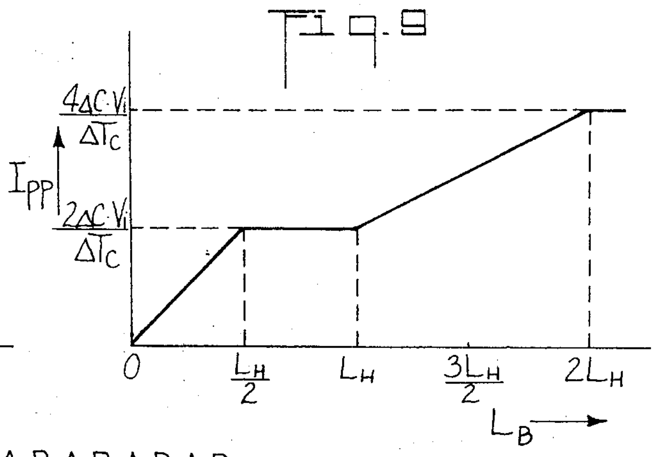
FIG. 9 is a graph used for explaining the color pickup apparatus of the invention.

FIG. 9 is a graph which illustrates according to the above equations (1) to (4) the relationship between $L_B$ and $I_{P-P}$ where $C$, $V_i$, and $L_H$ are taken constant, respectively. In the graph of FIG. 9, the abscissa represents $L_B$, which is the longer diameter of the spot of the electron beam, and the ordinate represents $I_{P-P}$, which is the peak to peak current value of the index signal current. According to FIG. 9 it is understood that the vertical length of the electron beam spot should be selected longer than the distance $L_H$ between successively scanned lines to obtain a larger index current or to reduce the voltage of the offset drive signal maintaining an index current constant.

If $V_S$ is smaller than $V_i$, the peak to peak current value $I_{P-P}$ of the index signal current is given by the following equation (5).

$$I_{P-P} = (2\Delta C \cdot V_S)/(\Delta T_C) \quad (5)$$

Therefore, $V_i$ should be selected as small as possible so as not to be larger than $V_S$. This prevents a line-crawling appearance.

With reference to FIGS. 10A to 14C, the electric charge patterns formed by the electron beam scanning on the photoelectric conversion layer 1 and the change in the surface potential on the electron beam scanning surface of the photoeectric conversion layer 1 will be now described where the longer diameter $L_B$ of the spot of the electron beam is taken as $L_B = L_H/2$, $L_B = L_H$ and $L_B = 2L_H$, respectively, on the assumption that the initial velocity of the electron beam is neglected.

Figures 10A, 10B, 10C:
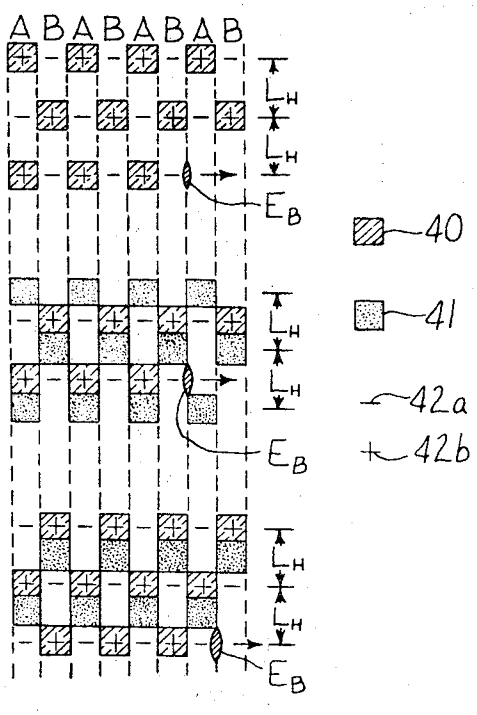
FIGS. 10A, 10B and 10C are diagrams illustrating electric charge patterns formed on the photoelectric conversion layer of the color pickup apparatus of the invention, when the electron beam has an elliptic cross-section with its major axis perpendicular to the scanning lines and having a length approximately equal to one-half the distance between scanning lines.

FIGS. 10A, 10B and 10C show electric charge patterns on the photoelectric conversion layer 1 formed by the electron beam scanning in the case where the longer diameter $L_B$ of the spot of the electron beam on the photoelectric conversion layer 1 is $L_H/2$ and the photoelectric conversion layer is subjected to uniform light. In this case, FIG. 10A corresponds to the first field, FIG. 10B to the Nth field and FIG. 10C to the (N+1)th field, respectively. In the figures, reference letter $E_B$ designates a spot of the electron beam and the letters A and B correspond to the index electrodes. Further, in the figures, reference numeral 40 indicates a part on the photoelectric conversion layer 1 which is highly charged by the new scanning on the field, numeral 41 represents a part on the photoelectric conversion layer 1 which is highly charged by the scanning of the previous field, reference numerals 42*a* and 42*b* are parts on the photoelectric conversion layer 1 where negative and positive index currents are obtained, respectively, by the scanning of the field.

Figure 11:
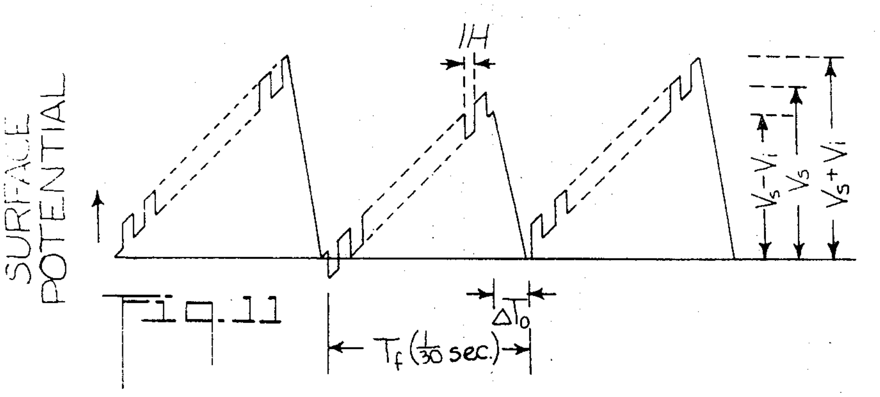
FIG. 11 is a graph showing the change of the surface potential on the photoelectric conversion layer in the case of the patterns in FIGS. 10A to 10C.

In the case of FIGS. 10A to 10C since the same part on the photoelectric conversion layer 1 is scanned at every other field or at every other frame by the electron beam, the surface potential of the same part on the photoelectric conversion layer 1 varies iwth a period $T_f$ = 1/30 (sec.), as shown in FIG. 11.

Figures 12A, 12B, 12C:
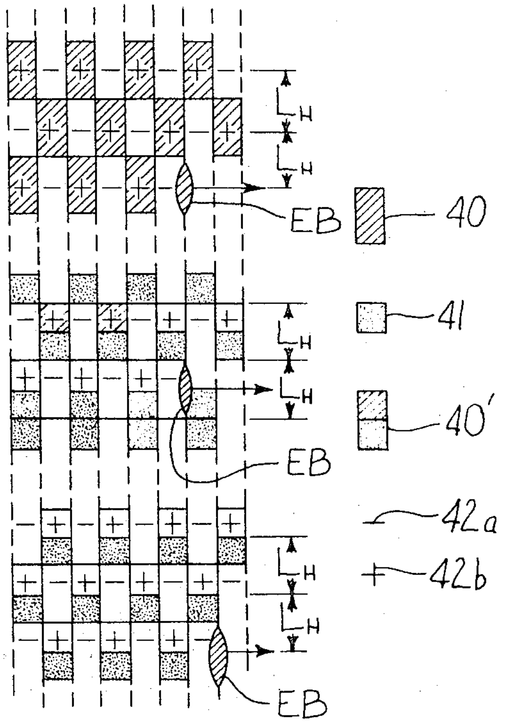
FIGS. 12A, 12B and 12C are diagrams similar to those of FIGS. 10A to 10C but with a longer major axis for the beam.

FIGS. 12A, 12B and 12C show electric charge patterns on the photoelectric conversion layer 1 due to the electron beam scanning in the case where the longer dimension of the spot of the electron beam on the photoelectric conversion layer 1 is equal to $L_H$. In that case, FIG. 12A corresponds to the first field, FIG. 12B to the Nth field, and FIG. 12C to the (N+1)th field, respectively. In these figures, reference numeral 40' indicates a part on the photoelectirc conversion layer 1 which is highly charged by the new scanning on the field similar to the part 40 in the case of FIG. 10A to 10C, but the part 40' includes a part which is highly charged by the scanning on the previous field, which differs from the part 40 of FIGS. 10A to 10C.

Figure 13:
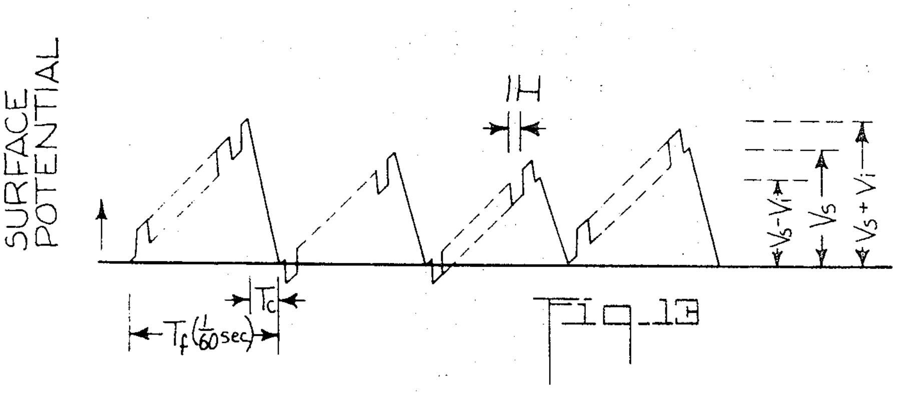
FIG. 13 is a graph, similar to that of FIG. 11, for the surface potential on the photoelectric conversion layer scanned to produce the patterns of FIGS. 12A to 12C.

In the case of FIGS. 12A to 12C, since the same part on the photoelectric conversion layer 1 is scanned by the electron beam at every field, the surface potential on the photoelectric conversion layer 1 varies with a period $T_f$ = 1/60 (sec.), as shown in FIG. 13.

As shown in FIGS. 10 and 12, areas of parts 42*a* and 42*b* are equal in both cases so that the index current does not increase if the beam length is changed from $L_H/2$ to $L_H$.

Figures 14A, 14B, 14C:
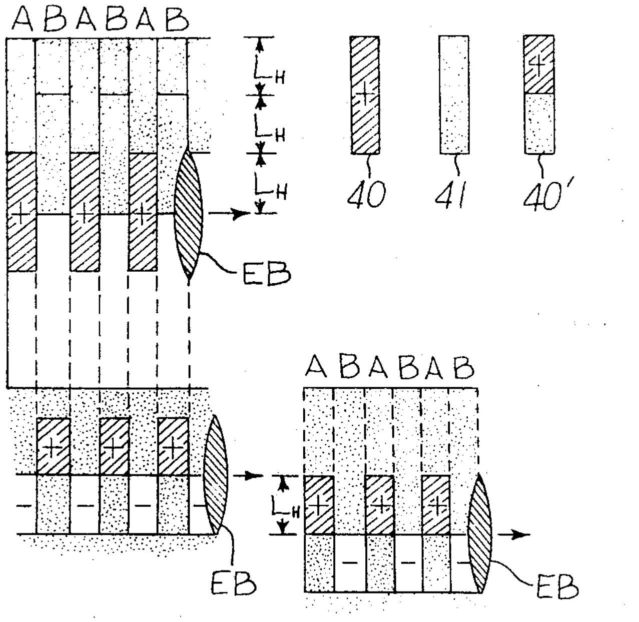
FIGS. 14A, 14B and 14C are diagrams, similar to those of FIGS. 10A to 10C, but with a still longer major axis.

FIGS. 14A, 14B and 14C show electric charge patterns on the photoelectric conversion layer 1 formed by the electron beam scanning thereon in the case where the longer dimension $L_B$ of the spot of the electron beam on the layer 1 is taken as $2L_H$. In this case, FIG. 14A corresponds to the first field, FIG. 14B, to the Mth line in the Nth field and FIG. 14C to the (M+1)th line in the Nth field, respectively.

In the case illustrated by FIGS. 14A to 14C, the same part on the photoelectric conversion layer 1 is scanned twice by the electron beam during the successive two line scanning, which is repeated at every field so that the surface potential of the same part on the layer 1 varies with a period $T_f$ = 1/60 (sec.).

Especially, in the case where the longer dimension $L_B$ of the spot of the electron beam on the photoelectric conversion layer 1 satisfies the condition $L_B = 2L_H$, areas of parts 42*a* and 42*b* becomes twice compared with the above cases and the photoelectric conversion characteristic of the layer 1 becomes uniform over its whole area to increase the sensitivity of the pickup tube 2 to its maximum.

A so-called line-crawling phenomenon that appears in a reproduced picture based on signals produced by such a color pickup tube will be hereinbelow described.

Figure 15:
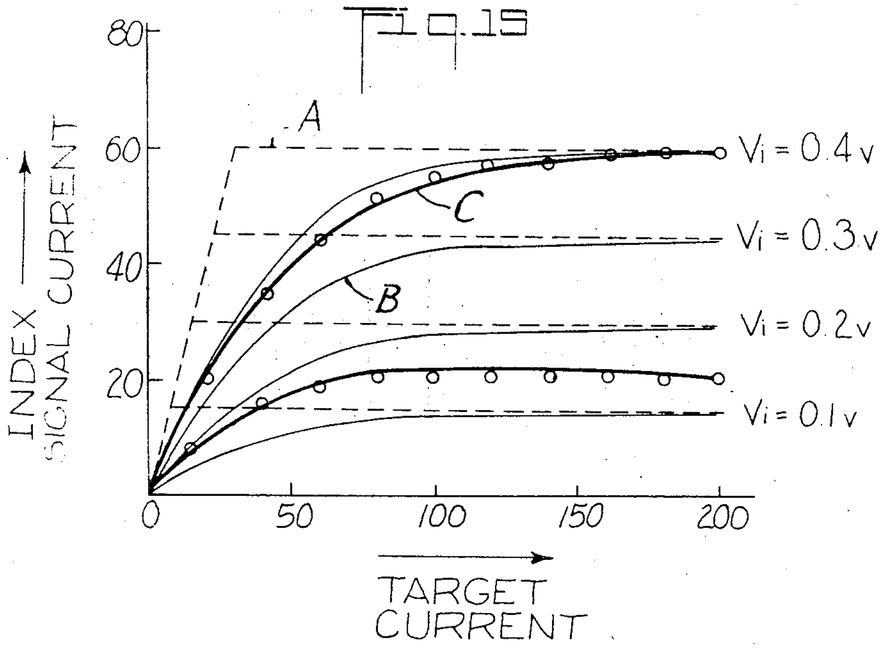
FIG. 15 is a graph showing the change of index signal currents corresponding to the target current.

With the color pickup tube described above, the light from the object is projected into the pickup tube in such a manner that one set of red, green and blue color strips of the optical filter corresponds to a pair of strip electrodes $A_i$ and $B_i$. However, in the case where the light from the object is projected onto the photoelectric coversion layer 1 only on the part corresponding to one of the strip electrodes $A_i$ or $B_i$, as in the case of menochromatic light (in the above example, red or blue light), the average index signal level corresponding to mth line becomes large, and the average index signal level corresponding to (m+1)th line becomes small. Therefore, the luminance signals are chaned with each other in level during the adjacent electron beam scannings, which causes a line-crawling in the picture. The change in level of the luminance signals may tend to increase with the increase of the level of the offset drive voltage applied to the strip electrodes A and B. Because, as shown in FIG. 15, a change of index signal current obtained from the tube becomes smaller if the offset drive signal voltage $V_i$ is selected to be lower. Th family of dotted curves A in FIG. 15 shows the calculated relationship between the index signal current and the target current, neglecting the initial beam velocity. The solid curves B are calculated on the basis of a target capacitance of 2,500pF, a beam current $I_b$ of 2$\mu$A, a repetition time $T_f$ of one-thirtieth second, and $\alpha$=3. The heavy curves C are drawn through small circles located at points actually measured.

With the present invention described above, the means are provided to make the shape of the spot of the electron beam on the photoelectric conversion layer such that the spot is elongated in the direction substantially perpendicular to the electron beam scanning direction, and the length $L_B$ of the spot in the direction substantially perpendicular to the electron beam scanning is selected longer than the electron beam scanning distance $L_H$ to reduce the level of the offset drive signal $V_i$, so that the appearance of line-crawling can be prevented from being generated in a reproduced picture, and the index pulse signal can be obtained with enough S/N ratio.

It may be possible instead of providing the optical filter F in the pickup tube 2 itself that a set of a lenticular lens and the optical filter mentioned above or a color optical filter lens is disposed in front of or closed to or opposed to the pickup tube 2.

In the above examples, the present invention is adapted to a color pickup apparatus with a single tube type, but the present invention may be adapted to a color pickup apparatus in which the chrominance signal is obtained from a pickup tube while the luminance signal is obtained from another pickup tube.

What is claimed is:

1. A color television camera comprising:

A. a photoresponsive surface to receive an optical image of an object;

B. electron beam generating means to generate a beam to form, in effect, an elongated spot area having a longer dimension ($L_B$) at said surface;

C. scanning means to cause said beam to scan said surface in a pattern of parallel lines substantially perpendicular to the long dimension of said spot and spaced apart by a distance ($L_H$), wherein ($L_B$) is greater than ($L_H$);

D. a plurality of elongate indexing electrodes substantially perpendicualr to said parallel lines and in close proximity to said surface, said electrodes being divided into interleaved sets with the electrodes of each set being electrically connected to the other electrodes in that set;

E. optical strip filter means between said object and said surface and aligned with said index electrodes to form said image as a color-separated image;

F. means to supply an offset voltage to said sets of electrodes to form an index image on said surface, the frequency of said offset voltage being synchronized with the line scanning frequency; and G. means for deriving from said surface a composite signal containing a color video signal corresponding to said color-separated image and an index signal corresponding to said index image.

2. The color television camera of claim 1 in which ($L_B$) is equal to at least $2L_H$.

3. The color television camera of claim 1 in which said filter means comprises red, blue and green filter strips in regular alternation, and there are two sets of said indexing electrodes, each pair of adjacent electrodes comprising one electrode from each set and having a total width substantially equal to the total width of three adjacent said filter strips including a red, a green, and a blue filter strip, whereby the charge patterns or said beam on said surface substantially prevents a line-crawling appearance in a reproduced television picture formed from said color video signal.

4. The color television camera of claim 1 comprising magnetic means to shape said beam to form said elongated spot.

5. The color television camera of claim 4 in which said magnetic means comprises means to exert a transverse magnetic force on said electron beam in said beam generating means.

6. The color television camera of claim 5 in which said beam generating means comprises a gun electrode having an aperture through which said beam passes and said magnetic means comprises:

A. a first part on one side of said gun electrode to exert a first transverse magnetic force on said beam before said beam reaches said gun electrode; and B. a second part on the other side of said gun electrode to exert an opposite transverse magnetic force on said beam after said beam emerges from said gun electrode.

7. The color television camera of claim 1 in which said beam generating means comprises a gun electrode having an elongated aperture through which said beam passes to form said beam with an elongated cross-section.

8. The color television camera of claim 1 comprising means to deflect said beam back and forth at a frequency substantially higher than frequencies in said color video signal to cause said beam to scan said elongated spot area.

* * * * *